United States Patent [19]

Wilhelm et al.

[11] Patent Number: 5,323,431
[45] Date of Patent: Jun. 21, 1994

[54] DEVICE FOR SECURING A REACTOR VESSEL WASHER TO A REACTOR VESSEL STUD

[75] Inventors: John J. Wilhelm, New Kensington; Ralph W. Tolino, Wilkinsburgh, both of Pa.; Charles L. Danley, Moore, S.C.

[73] Assignee: Westinghouse Electric Corp., Pittsburgh, Pa.

[21] Appl. No.: 18,127

[22] Filed: Feb. 16, 1993

[51] Int. Cl.⁵ ........................................... G21C 19/00
[52] U.S. Cl. .................................. 376/260; 376/263; 411/533
[58] Field of Search ............... 376/263, 260, 205, 463; 411/533; 403/367; 29/723

[56] References Cited

U.S. PATENT DOCUMENTS

| | | | |
|---|---|---|---|
| 3,455,198 | 7/1969 | Barrett | 411/533 |
| 4,520,446 | 5/1985 | Sato | 29/723 |
| 4,785,520 | 11/1988 | Bourdonne et al. | 376/263 |
| 4,899,436 | 2/1990 | Jacquier | 29/723 |
| 5,046,386 | 9/1991 | Frizot | 29/723 |
| 5,051,049 | 9/1991 | Wills | 411/533 |
| 5,203,656 | 4/1993 | McKinlay | 411/533 |

Primary Examiner—Daniel D. Wasil
Attorney, Agent, or Firm—Peyton C. Watkins

[57] ABSTRACT

A device for removably securing a reactor vessel washer to a reactor vessel stud for use in combination with a reactor vessel including a dome having a first flange positioned abutting a second flange of a reactor body, a plurality of reactor studs are disposed in both the first and second flanges and a nut and washer arrangement secured to the stud for rigidly attaching the dome to the body. The device comprises a retainer removably disposed on the stud and operable to mate the washer to the stud to maintain the positional relationship of the stud and washer as the stud is removed from the dome and the body.

7 Claims, 6 Drawing Sheets

DEVICE FOR SECURING A REACTOR VESSEL WASHER TO A REACTOR VESSEL STUD

BACKGROUND OF THE INVENTION

1. Field of the Invention

The present invention relates generally to nuclear reactor vessels and, more particularly, to a device for securing a reactor vessel washer to a reactor vessel stud, allowing the stud and washer to be maintained as a mated pair during removal and replacement of the stud.

2. Description of the Prior Art

In a commercial nuclear reactor vessel, heat, from which steam and ultimately electricity are generated, is produced by fission of a fissile material, such as uranium disposed inside the reactor vessel. The reactor vessel includes a body having a cylindrical wall with two ends. The wall includes an outwardly extending flange at one end, and a semicircular domed bottom is integrally attached to the opposite end of the wall. A reactor dome is attached to the body and is positioned atop the body. The dome has a semicircular shape with an annular shaped lip portion as is well known in the art. An outwardly extending flange is disposed around the circumference of the dome at the lip portion. The body flange is positioned abutting the dome flange. A plurality of holes through the dome flange are in registry with a plurality of holes inserted partially through the body flange. Each hole in the dome mates with a corresponding hole in the body flange forming a matched pair of holes. A plurality of washers, in registry with a flange hole, are positioned over the matched holes. A plurality of studs each having two ends and a threaded shaft are used to attach the dome to the body. The plurality of studs, each with a nut attached at one end, are disposed respectively through the matched holes with the stud and washer forming a mated pair. The studs are threaded into both flanges such that one end passes through both flanges, and the other end, which accepts the nut, extends upwardly from the abutting flanges. The stud is disposed in a matched pair of holes such that the nut abuts the top of the washer. The nut and washer together function to rigidly attach the dome to the body.

Due to maintenance procedures, regulations, and the need to replenish expended fuel, the interior of the reactor vessel should be periodically inspected. To inspect the interior, the dome may be repeatedly removed. However, once the dome is initially installed, during reinstallation of the dome the stud and washer should be maintained as a mated pair. This is because the stud is stressed when it is installed, and the nut and washer, thereafter, conform to the stressed stud. Therefore, each stud, nut and washer is slightly altered and installing them on a different stud could cause them to fit improperly.

One means of removing the reactor vessel head to facilitate inspection of the interior of the vessel is disclosed in U.S. Pat. No. 4,873,760. This patent discloses an apparatus which includes a gripper and is positioned over the dome. The gripper unthreads a nut associated with a particular stud, and then an attracting device magnetically attracts the washer such that the washer is forced into the gripper and abuts the nut. The gripper places the nut and washer on a pin and repeats the process for each of the nuts to be removed. The studs are then unthreaded, and the dome is removed.

Another known method includes an apparatus, generally referred to in the art as an Automated Stud Handling and Transportation System, which is positioned on the vessel head flange. A stud remover of this apparatus completely removes the stud with the nut secured on one end of the stud. The washer is manually removed from the stud and affixed to a hook on the apparatus. Next, a movable arm for holding the stud attaches to the stud. The stud remover then moves so that it is positioned over an adjacent stud. The above process is repeated until all studs are removed. Once all the studs are removed, the dome is removed by a crane. To install the studs, the process is reversed.

A major drawback to each of the above methods is that the stud and washer are removed separately. Thus, repeatedly removing and installing the studs makes the identification of which washer should be associated with a particular stud extremely difficult. As stated above, the same nut and washer should be maintained as a mated pair each time the stud is removed and then replaced. Prudent practice dictates that if a particular stud and its associated washer and nut can't be identified, a new nut and washer should be installed. This obviously results in increased costs each time the vessel head is removed and thereafter re-installed.

Another drawback to each of the above methods is that when installing the studs a worker must carefully position each washer concentrically over the matched holes. This is a time consuming operation, and, therefore, a worker will have increased exposure to radiation in the reactor. Still further, if the washer is improperly aligned with the matched holes, the washer may be damaged as the stud is inserted.

Consequently, a need exists for a simple device for removably securing a reactor vessel washer to a vessel stud allowing the washer and stud to be maintained as a mated pair during removal and replacement of the stud.

SUMMARY OF THE INVENTION

The present invention provides an improvement designed to satisfy the aforementioned needs. Particularly, the present invention is directed to a device for removably securing a reactor vessel washer to a reactor vessel stud and is operable for use with a reactor vessel including a dome having a first flange positioned abutting a second flange of a reactor body, a plurality of reactor studs are disposed in both the first and second flanges; and a nut and washer, both having an inner peripheral surface, used for tightening the studs and for attaching the dome to the body. The device comprising a retainer removably disposed on the stud and operable to mate the washer to the stud to maintain the positional relationship of the stud and washer as the stud is removed from the dome and body.

BRIEF DESCRIPTION OF THE DRAWINGS

While this specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENTS

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

IN GENERAL

Figure 1:
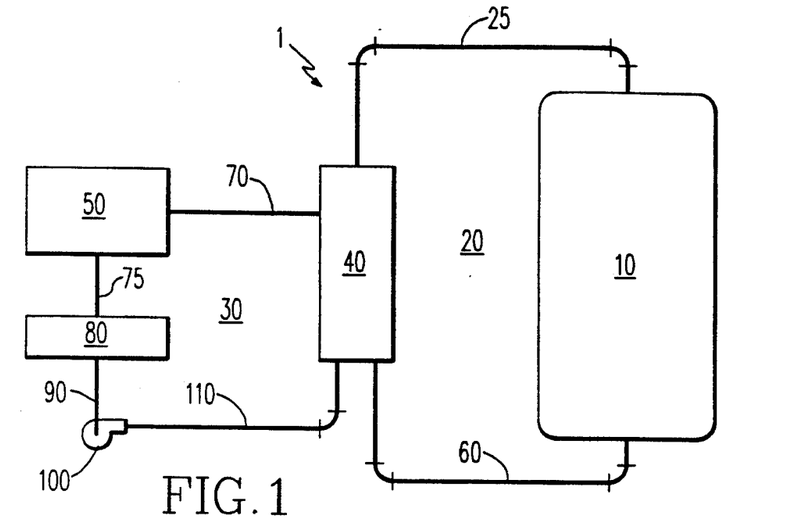
FIG. 1 is a schematic diagram of a portion of a nuclear power plant facility.

Referring to the drawings wherein like reference numerals refer to like elements, FIG. 1 depicts a portion of a nuclear plant facility, such as a pressurized water nuclear reactor 1 containing a reactor vessel, generally referred to as 10, for generating heat by nuclear reactions. Typically, a primary coolant such as borated water (not shown) inside the reactor vessel 10 functions to control the reaction and convey heat away from the reactor vessel 10. The primary coolant which may become radioactive in the reactor vessel 10 flows through a portion of a closed loop, generally referred to as a primary loop 20. Referring to such primary loop 20, the primary coolant flows out of the reactor vessel 10 via a pipe 25, referred to in the art as the hot leg, and transfers its heat to a water-filled secondary system, generally referred to as 30. Steam is created in a steam generator 40 from water in the secondary system 30 and is conveyed to a turbine 50-generator (not shown) set. In the primary loop 20, the primary coolant exits the steam generator 40 via a pipe 60, referred to in the art as the cold leg, and returns to the reactor vessel 10 to repeat the above described cycle. With respect to the secondary system 30, the steam of the secondary system 30 is isolated from the primary coolant and exits the steam generator 40 via a steam line 70 and is conveyed to an energy utilization device such as the steam turbine 50 which in conjunction with an electrical generator (not shown) produces electricity. Once entering the turbine 50, the steam turns turbine blades (not shown) and then exits the turbine 50 via a pipe 75 and flows into a condenser 80. Within the condenser 80, the steam is condensed back to water and is conveyed through a pipe 90 to a pump 100 which pumps the water through a pipe 110 back to the steam generator 40.

Figure 2:
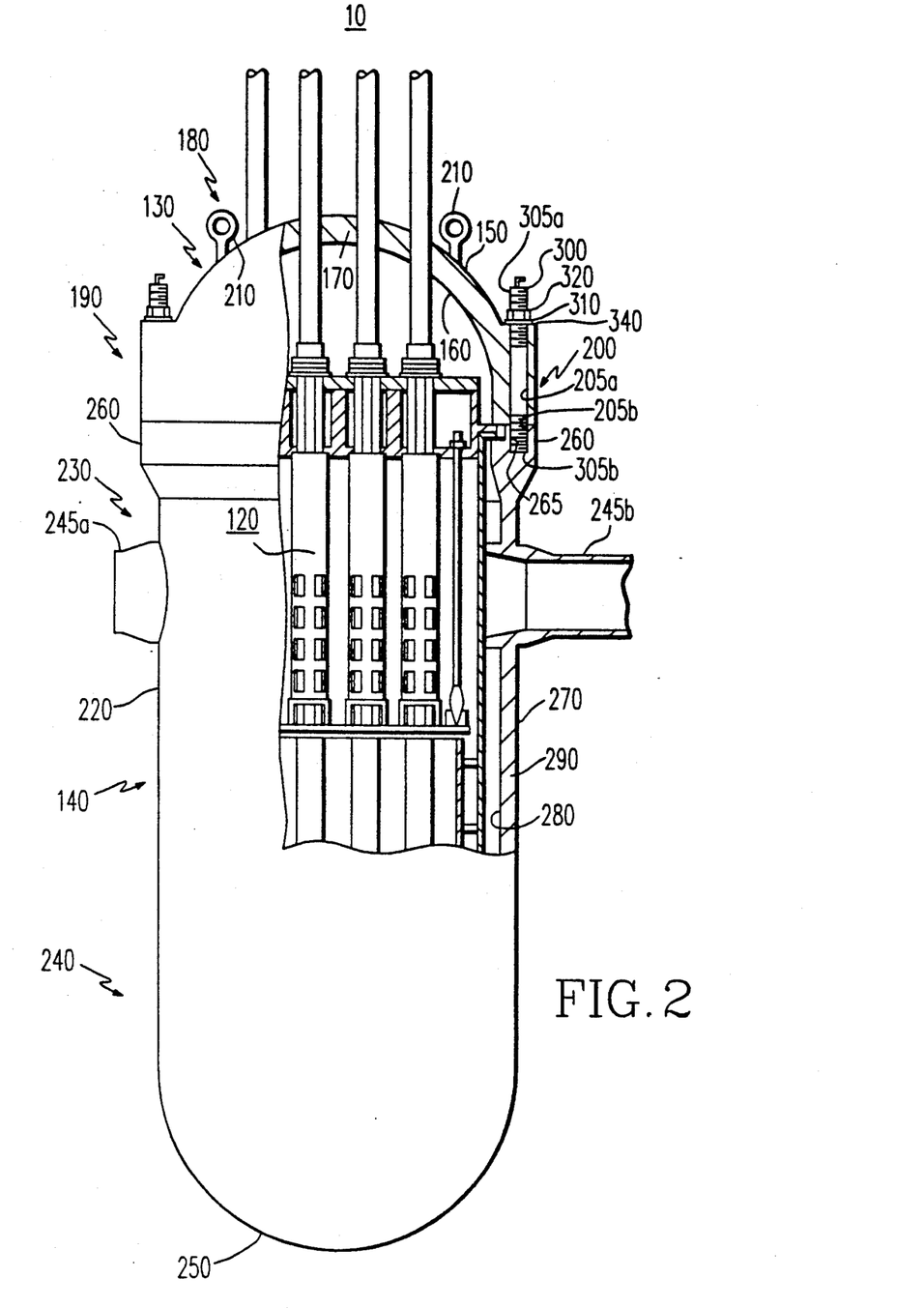
FIG. 2 is a partial sectional, side elevational view of a nuclear reactor.

Now referring to FIG. 2, the reactor vessel 10, which is typically made of carbon steel, is shown having an interior wherein components such as fuel assemblies 120 for generating heat by nuclear reactions are disposed. The reactor vessel includes a semicircular dome 130 mounted atop a vessel body 140. The dome 130 has an exterior surface 150 and an interior surface 160 spaced from each other to define a wall 170 extending between the two. The dome includes an upper portion 180 and a lower portion 190. A flange 200 having a plurality of holes 205a (one shown) is disposed circumferentially around the dome lower portion 190 and extends radially from the lower portion 190. Two lifting lugs 210 are attached to the dome upper portion 180 and are configured to receive a crane hook (not shown) for moving the dome 130.

The vessel body 140 has a generally cylindrical side wall 220 having an upper portion 230 and a lower portion 240. The side wall 220 has, in this particular embodiment, two outwardly extending nozzles 245a and 245b disposed at opposite sides of the side wall 220. One nozzle 245a conveys the coolant away from the reactor vessel 10, and the other nozzle 245b allows the coolant to re-enter the reactor vessel 10. A semicircular domed bottom 250 is integrally attached to the lower portion 240 of the side wall 220. The body 140, likewise, includes an exterior surface 270 and an interior surface 280 spaced from each other to define a wall 290 extending between the two. A circumferentially extending flange 260 is attached to the side wall 220 upper portion 230 and extends radially therefrom. The flange 260 has a plurality of holes 205b (one shown) disposed circumferentially around the flange 260. When the dome 130 is placed on the vessel body 140, the body flange holes 205b and the dome flange holes 205a are positioned in registry with each other forming a mated flange. Each dome flange hole 205a is, therefore, aligned with a corresponding body flange hole 205b forming a pair of matched holes 205a and 205b. A plurality of studs 300 having two ends 305a and 305b are positioned in a pair of matched holes 205a and 205b. One end 305b of the stud is positioned in the matched holes 205a and 205b, and the other end 305a, which receives the nut 320, extends upwardly from the flanges 200 and 260. The stud 300 includes a cylindrical threaded stud shaft. An annular washer 310 is disposed on the stud 300 and abuts an outer surface 340 of the dome flange 200. A nut 320 is threaded onto one end 305a of the stud 300 for securing the dome 130 to the body 140.

Figure 3:
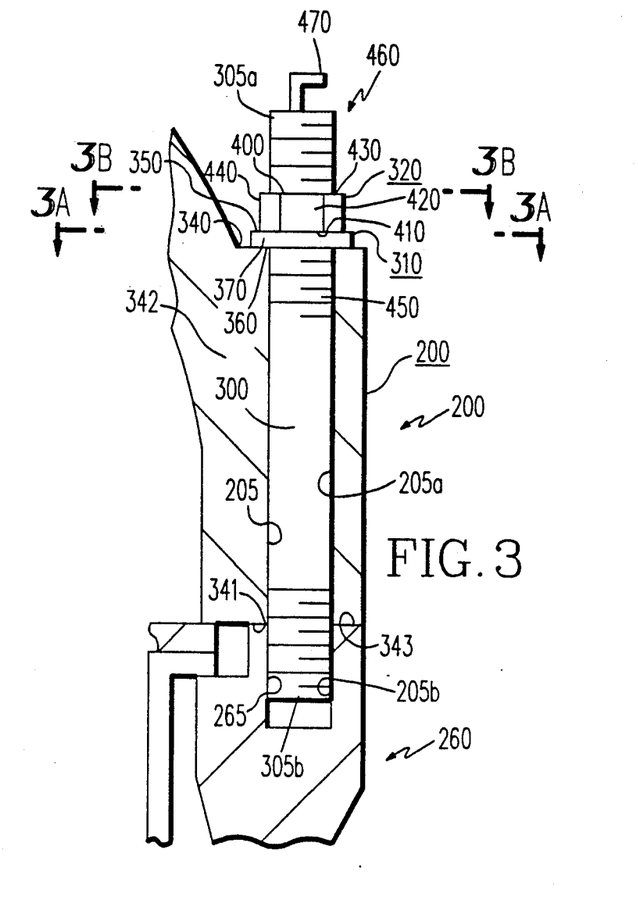
FIG. 3 is a partial sectional, side elevational detail view of a washer and nut installed on a flange of the reactor vessel.
Figure 3A:
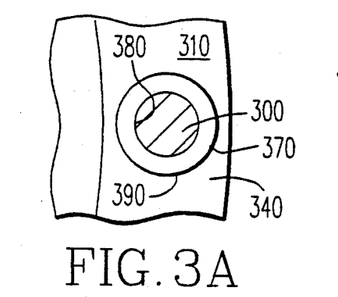
FIG. 3A is a top plan view taken along line 3A—3A of FIG. 3.
Figure 3B:
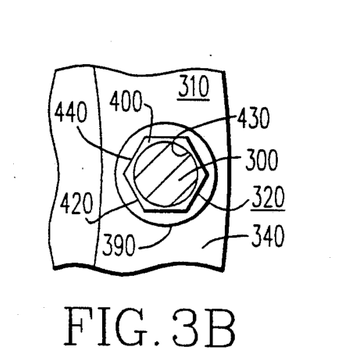
FIG. 3B is a top plan view taken along line 3B—3B of FIG. 3.

Referring to FIG. 3, a detailed view of the stud 300 positioned in a pair of matched holes 205a and 205b is illustrated. The head flange 200 includes a top surface 340 and a bottom surface 341 spaced from each other to define a wall thickness 342 extending between the two. The body flange 260 includes a top surface 343 abutting the bottom surface 341 of the flange 200. The annular shaped washer 310 includes a top surface 350 and a bottom surface 360 spaced apart from each other to define a wall thickness 370 between the two, and the bottom surface 360 is disposed abuttingly atop the top surface 340 of the head flange 200. As best seen in FIG. 3A, the wall thickness 370 of the washer 310 is bored to define an opening having an arcuate shaped inner peripheral surface 380 disposed adjacent the stud 300 upon assembly and an arcuate shaped outer peripheral surface 390. Referring back to FIG. 3, the nut 320 also includes a top surface 400 and a bottom surface 410 spaced apart from each other to define a wall thickness 420 between the two. Referring to FIG. 3B, the wall thickness 420 of the nut 320, likewise, is bored to define an opening having an arcuate shaped inner peripheral surface 430 disposed adjacent the stud 300 upon assembly and an arcuate shaped outer peripheral surface 440. The inner peripheral surface 430 is threaded to mate with the threaded shaft of the stud 300. Referring back to FIG. 3, the nut bottom surface 410 abuts the washer top surface 350. The stud 300 includes a cylindrical threaded shaft, and a top portion 460 includes a L-shaped gripper 470 allowing the stud 300 to be readily attached to a mechanical threading lifting device.

Figure 4:
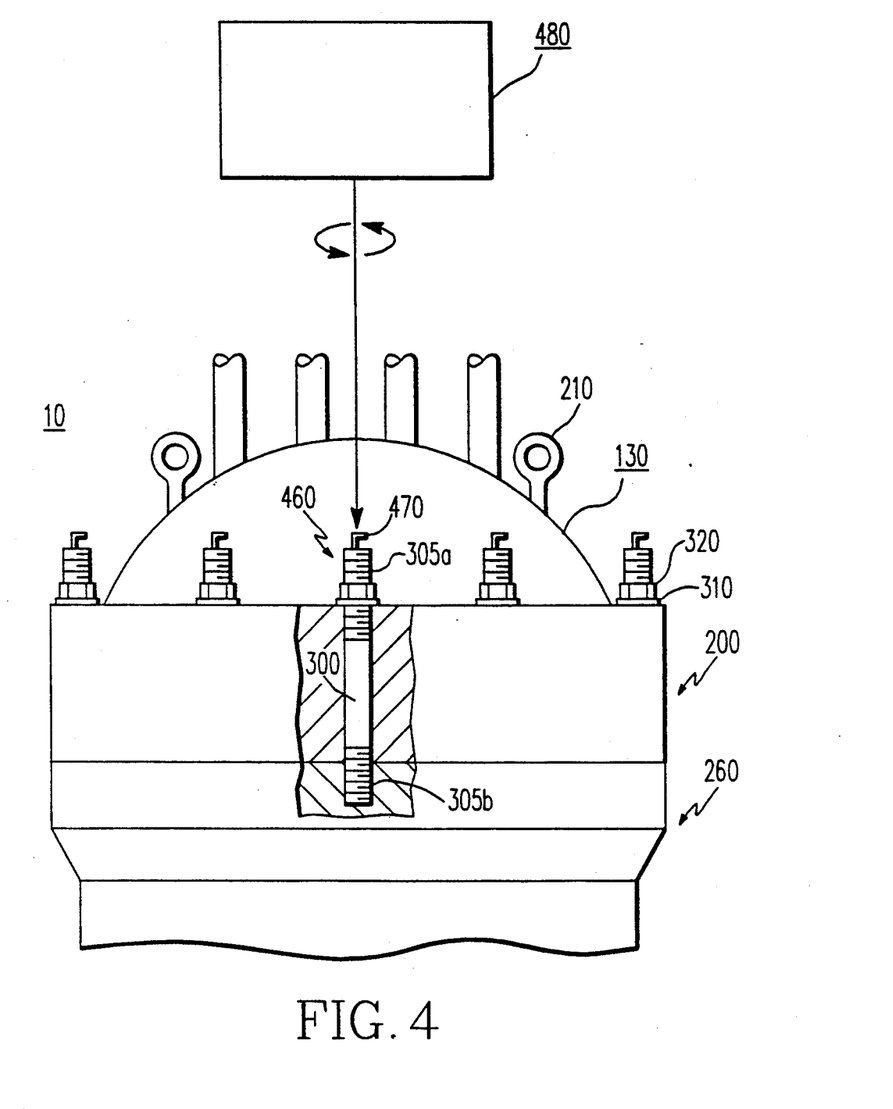
FIG. 4 is a partial schematic and partial side elevational view of a device for removing and installing studs and positioned atop the reactor vessel.

Referring to FIG. 4, a device 480 for removing and installing the reactor vessel studs 300 is shown and is generally referred to in the art as an Automated Stud Handling and Transport System as is well known in the art. To remove each of the studs 300, the device 480 is positioned on the dome flange 200 to engage a stud 300 and then operated to unscrew the stud 300. After all the studs 300 are removed, a crane (not shown) is attached to each lifting lug 210 for removing the dome 130 providing access into the interior of the reactor vessel 10. To install the dome 130, the process is reversed.

RETAINER OF THE PRESENT INVENTION

Figure 5:
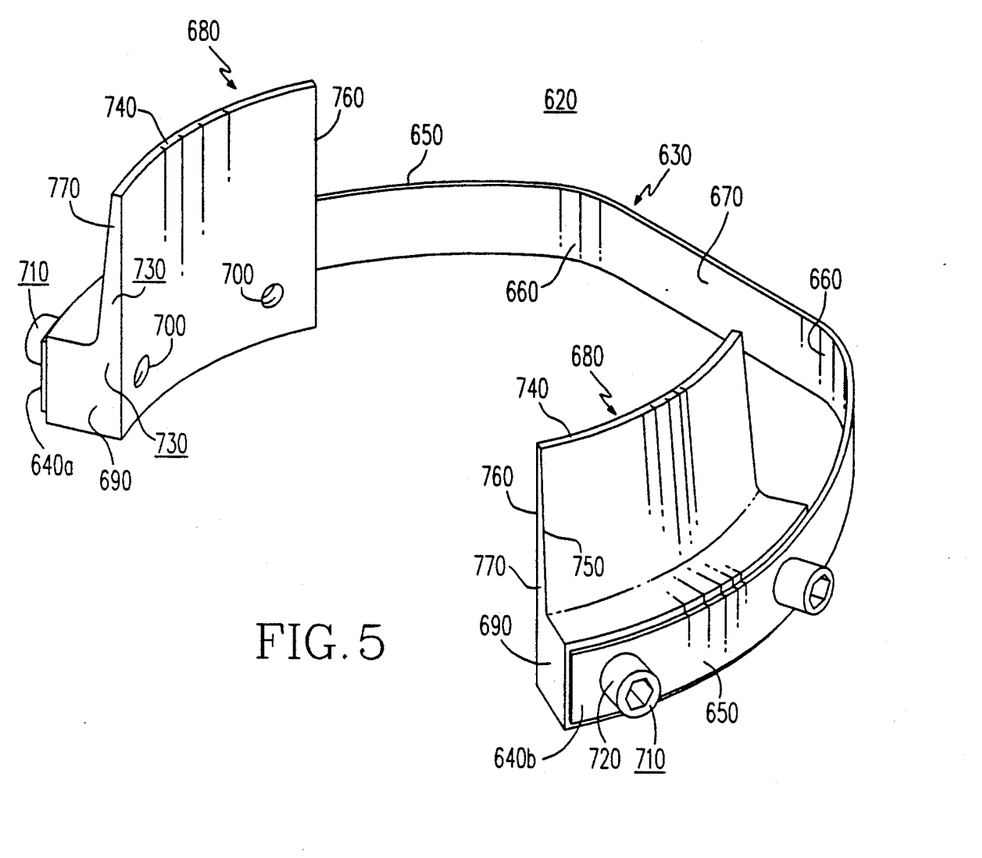
FIG. 5 is a perspective view of the retainer of the present invention allowing the washer and stud to be removed and installed as a mated pair.

Referring to FIG. 5, there is illustrated a retaining device 620 of the present invention operable to mate the washer to the stud to maintain the positional relationship of the stud and washer. The retaining device 620 includes a resilient, generally "U" shaped strap 630. The strap 630 has two arcuate shaped sides 650 connected respectively at two bend portions 660 to a substantially straight middle portion 670. The strap 630 has two ends 640a and 640b each having a pair of holes (not shown). A wedge 680, typically made of nylon, is attached to each of the ends 640a and 640b of the strap 630. Each wedge 680 includes a thickened, rectangular shaped lower body 690 having two threaded holes 700 (one pair shown) therethrough. The lower body 690 is attached to each strap side 650 preferably by a pair of bolts 710 each having a threaded shaft (not shown) and a bolt head 720. The bolt shaft is disposed through each strap hole and is threaded into the wedge hole 700 until the bolt head 720 abuts the strap side 650. The lower body 690 is thickened to increase the wedge 680 strength in this area. The wedge 680 includes an upper body 730 which extends outwardly from the lower body 690. The upper body 730 is tapered and terminates at a generally pointed lip portion 740. The wedge 680 includes an outer surface 750 and an inner surface 760 each having a generally arcuate shape and spaced apart from each other defining a wall thickness 770 between the two. The inner surface 760 is arcuate shaped to conform to the shape of the stud 300 (see FIG. 3).

Figure 6:
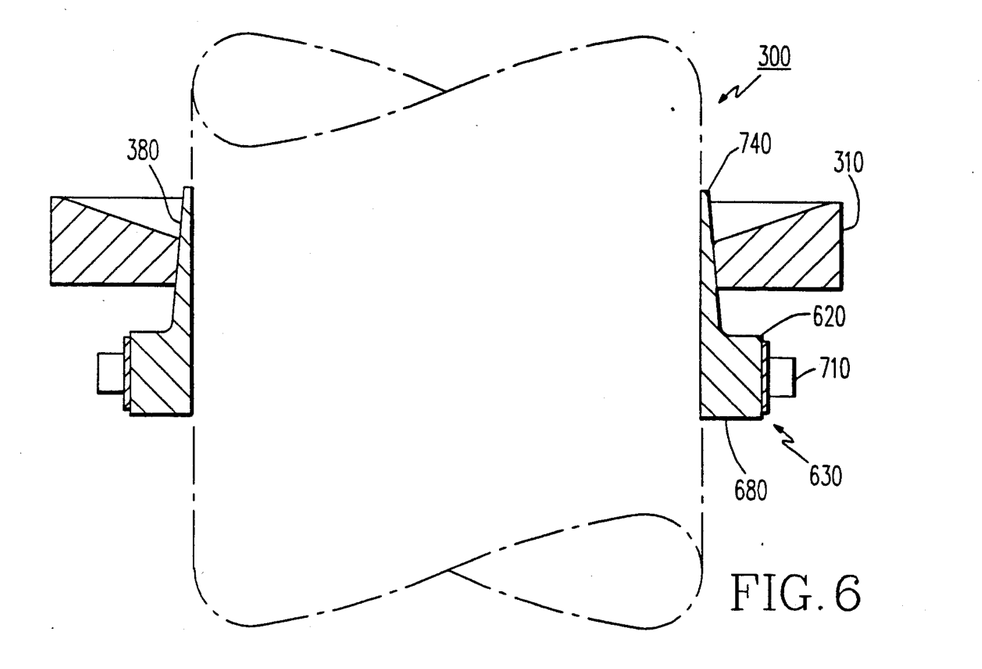
FIG. 6 is a view in vertical cross section of the retainer installed on a reactor vessel stud.
Figure 7:
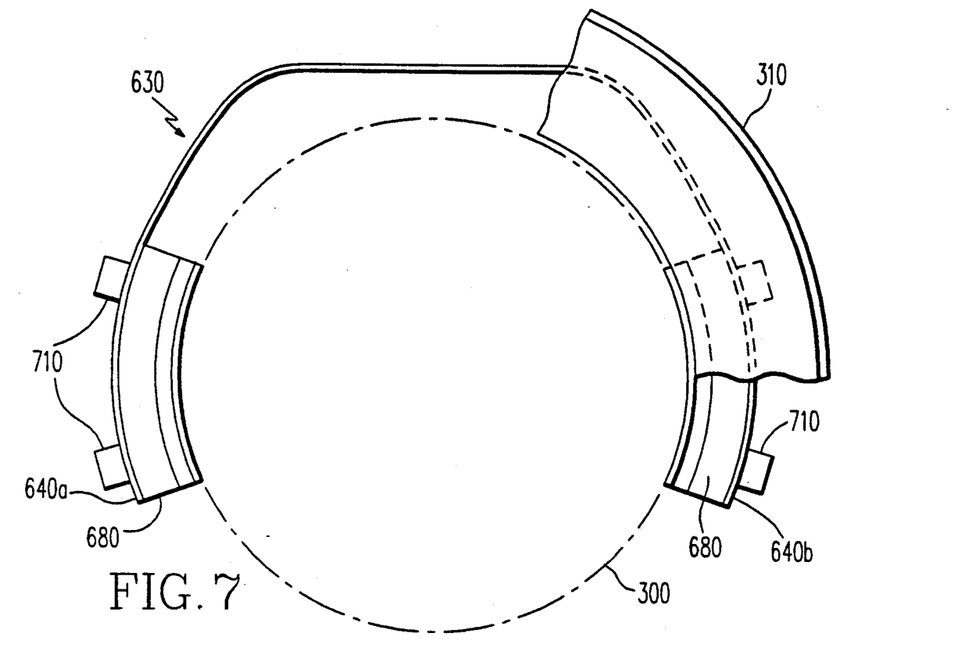
FIG. 7 is a top plan view of the retainer installed on a reactor vessel stud.

Referring to FIGS. 6 and 7, to install a retaining device 620 on a stud 300, the ends 640a and 640b of the strap 630 are slide over the stud 300 so that the wedges 680 are spaced generally one hundred and eighty degrees from each other on opposite sides of the stud 300. The strap 630 is made from a resilient material to allow it to expand to receive the stud and then return to its original shape to fit generally concentrically around the stud 300. The lip portion 740 of each wedge 680 is slidably inserted between the stud 300 and the washer inner peripheral surface 380, and the washer 310 and retaining device 620 are urged towards each other to allow the wedges 680 to fit firmly between the washer 310 and the stud 300. In this manner, the washer 310 is retained on the stud 300 until the retaining device 620 is removed. To remove the retaining device 620, the above described process is reversed.

Figure 8:
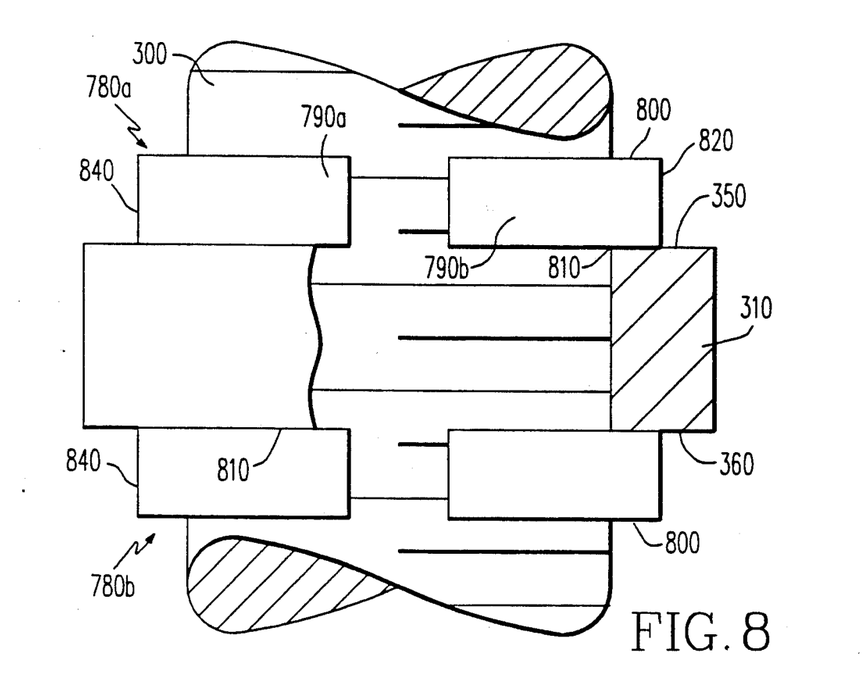
FIG. 8 is a partial side elevational view of an alternative embodiment of the present invention illustrating a pair of clamps disposed on a reactor vessel stud.
Figure 9:
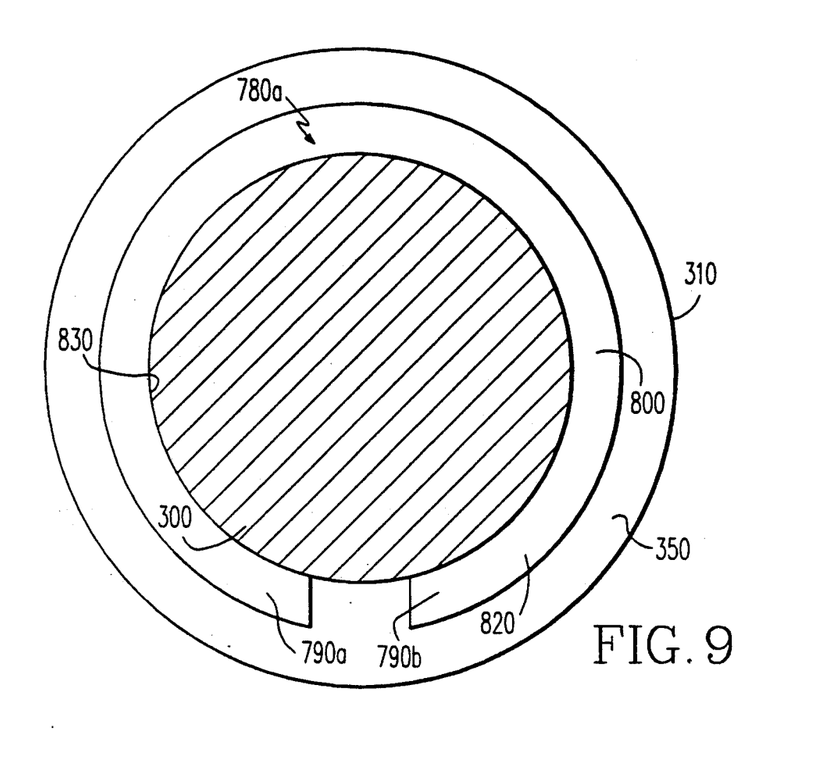
FIG. 9 is a top plan view of the alternative embodiment of the present invention.

Referring to FIGS. 8 and 9, an alternative embodiment of the retaining device of the present invention is illustrated. A pair of semi-circular shaped clamps 780a and 780b having two ends 790a and 790b are respectively disposed abutting the top and bottom surfaces 350, 360 of the washer 310. Each clamp 780a and 780b is disposed circumferentially around the stud 300 so that the ends 790a and 790b generally face each other. The clamps 780a and 780b, likewise, are made of a resilient material allowing it to pass around the stud 300 without losing its original shape. Each clamp 780a and 780b includes a top surface 800, and a bottom surface 810 spaced apart from each other defining a wall 820 between the two. The wall 820 includes an arcuate shaped inner peripheral surface 830 adjacent the stud 300, and an arcuate shaped outer peripheral surface 840 outwardly spaced from the inner peripheral surface. One clamp 780a bottom surface 810 abuts the washer top surface 350, and the other clamp 780b top surface 800 abuts the washer bottom surface 360. Each clamp 780a and 780b frictionally engages the shaft of the stud 300 and, therefore, is not movable on the stud 300. The pair of clamps 780 in combination with each other keep the washer 310 from sliding.

Therefore, what is provided is a device for removably securing a reactor vessel washer to a vessel stud allowing the stud and washer to be maintained in a mated pair during the removal and installation of the stud.

Although the invention is fully described herein, it is not intended that the invention as illustrated and described be limited to the details shown, because various modifications may be obtained with respect to the invention without departing from the spirit of the invention or the scope of equivalents thereof. For example, two wedges, without a connecting strap, may be disposed between the stud and washer for retaining the washer and stud as a mated pair.

We claim:

1. A device for removably securing a reactor vessel washer to a reactor vessel stud and operable for use with a reactor vessel including a dome having a first flange positioned abutting a second flange of a reactor body, a plurality of reactor studs disposed in both the first and second flanges; and a nut and washer, both having an inner peripheral surface, sued for tightening the studs and for attaching the dome to the body, the device comprising a retainer including a first wedge having a tapered body which wraps circumferentially and partially around a shaft of the stud, and at least a portion of the tapered body is disposed between the washer inner peripheral surface and the stud for maintaining the positional relationship between the washer and the stud.

2. The device as in claim 1 wherein said retainer includes: a generally U shaped strap having a pair of end portions and arranged to extend circumferentially around a portion of the stud;

said first wedge having a tapered body and a portion of the wedge body disposed at least partially between the washer and stud for maintaining the positional relationship of the washer and the stud;

a second wedge having a tapered body and a portion of the wedge body disposed at least partially between the washer and stud for maintaining the positional relationship of the washer and the stud.

3. The device as in claim 2 wherein said wedge is nylon.

4. A device for removably securing a reactor vessel washer to a reactor vessel stud and operable for use with a reactor vessel including a dome having a first flange positioned abutting a second flange of a reactor body, a plurality of reactor studs disposed in both the first and second flanges, and a nut and washer, both having an inner peripheral surface, used for tightening the studs and for attaching the dome to the body, the device comprising:

a first clamp having a generally semi-circular shape and disposed on the stud and abutting a first surface of the washer; and a second clamp having a generally semi-circular shape and disposed on the stud and abutting a second surface of the washer.

5. A device for removably securing a reactor vessel washer to a reactor vessel stud; the reactor vessel includes a dome having a first flange positioned abutting a second flange of a reactor body, a plurality of reactor studs are disposed in both the first and second flanges for attaching the dome to the body, and a nut and washer are used for tightening the studs, the device comprises:

(a) a generally U shaped strap having first and second ends and disposed circumferentially around a portion of the stud; and (b) first and second wedges each having a tapered body and secured to said first and second ends, at least a portion of each of said first and second wedges disposed at least partially between the washer and stud for maintaining the positional relationship of the stud and washer.

6. The device as in claim 5 wherein said washer has an inner peripheral surface and at least a portion of the tapered body of each of said wedges is adapted to urge between the inner peripheral surface and the stud.

7. The device as in claim 6 wherein said wedges are nylon.

* * * * *